US011792210B2

(12) United States Patent
Brown et al.

(10) Patent No.: US 11,792,210 B2
(45) Date of Patent: Oct. 17, 2023

(54) MAPPING UNBOUNDED INCIDENT SCORES TO A FIXED RANGE

(71) Applicant: CrowdStrike, Inc., Sunnyvale, CA (US)

(72) Inventors: Daniel W. Brown, Beverly, MA (US); Sseziwa A. Mukasa, Salem, MA (US)

(73) Assignee: CrowdStrike, Inc., Sunnyvale, CA (US)

(*) Notice: Subject to any disclaimer, the term of this patent is extended or adjusted under 35 U.S.C. 154(b) by 294 days.

(21) Appl. No.: 16/944,033

(22) Filed: Jul. 30, 2020

(65) Prior Publication Data
US 2021/0037028 A1 Feb. 4, 2021

Related U.S. Application Data

(60) Provisional application No. 62/882,339, filed on Aug. 2, 2019.

(51) Int. Cl.
*H04L 9/40* (2022.01)
*H04L 41/0604* (2022.01)
(Continued)

(52) U.S. Cl.
CPC ...... *H04L 63/1416* (2013.01); *H04L 41/0627* (2013.01); *H04L 41/22* (2013.01);
(Continued)

(58) Field of Classification Search
None
See application file for complete search history.

(56) References Cited

U.S. PATENT DOCUMENTS 9,158,811 B1  10/2015  Choudhary et al.
9,407,652 B1   8/2016  Kesin et al.
(Continued)

FOREIGN PATENT DOCUMENTS

EP   3206366       8/2017
EP   3528459 A1   8/2019

OTHER PUBLICATIONS

Extended European Search Report from the European Patent Office for U.S. Appl. No. 16/943,755, dated Dec. 14, 2020, a counterpart foreign application of U.S. Appl. No. 16/943,755, 8 pages.
(Continued)

*Primary Examiner* — Mohamed A. Wasel
*Assistant Examiner* — Gregory P Tolchinsky
(74) *Attorney, Agent, or Firm* — Lee & Hayes, P.C.

(57) ABSTRACT

Techniques and systems to provide a more intuitive user overview of events data by mapping unbounded incident scores to a fixed range and aggregating incident scores by different schemes. The system may detect possible malicious incidents associated with events processing on a host device. The events data may be gathered from events detected on the host device. The incident scores for incidents may be determined from the events data. The incident scores may be mapped to bins of a fixed range to highlight the significance of the incident scores. For instance, a first score mapped to a first bin may be insignificant while a second score mapped to a last bin may require urgent review. The incident scores may also be aggregated at different levels (e.g., host device, organization, industry, global, etc.) and at different time intervals to provide insights to the data.

19 Claims, 7 Drawing Sheets

(51) Int. Cl.
  *H04L 41/22* (2022.01)
  *H04L 43/16* (2022.01)
(52) U.S. Cl.
  CPC .......... *H04L 43/16* (2013.01); *H04L 63/1425* (2013.01); *H04L 63/20* (2013.01)

(56) References Cited

U.S. PATENT DOCUMENTS

| | | | |
|---|---|---|---|
| 9,516,053 | B1 | 12/2016 | Muddu et al. |
| 9,594,904 | B1 | 3/2017 | Jain et al. |
| 10,320,813 | B1* | 6/2019 | Ahmed ............... H04L 63/1416 |
| 10,735,272 | B1 | 8/2020 | Saurabh |
| 10,778,699 | B1* | 9/2020 | Bradley .............. H04L 63/1441 |
| 10,992,693 | B2 | 4/2021 | Luo et al. |
| 11,102,244 | B1* | 8/2021 | Jakobsson ............... H04L 51/42 |
| 2002/0083343 | A1 | 6/2002 | Crosbie et al. |
| 2007/0209074 | A1 | 9/2007 | Coffman |
| 2012/0137367 | A1 | 5/2012 | Dupont et al. |
| 2013/0021382 | A1 | 1/2013 | Morlock et al. |
| 2015/0242637 | A1 | 8/2015 | Tonn et al. |
| 2015/0334132 | A1 | 11/2015 | Zombik et al. |
| 2016/0226904 | A1 | 8/2016 | Bartos et al. |
| 2016/0344762 | A1 | 11/2016 | Jou et al. |
| 2017/0093900 | A1 | 3/2017 | Nomura et al. |
| 2017/0171389 | A1 | 6/2017 | Lopez et al. |
| 2017/0230392 | A1* | 8/2017 | Dean ................... H04L 63/1425 |
| 2017/0288979 | A1 | 10/2017 | Yoshihira et al. |
| 2018/0159876 | A1 | 6/2018 | Park et al. |
| 2018/0167402 | A1 | 6/2018 | Scheidler et al. |
| 2018/0227322 | A1 | 8/2018 | Luo et al. |
| 2018/0288060 | A1 | 10/2018 | Jackson et al. |
| 2018/0316704 | A1 | 11/2018 | Joseph Durairaj et al. |
| 2018/0367548 | A1 | 12/2018 | Stokes, III et al. |
| 2019/0068627 | A1 | 2/2019 | Thampy |
| 2019/0207969 | A1 | 7/2019 | Brown |
| 2019/0362074 | A1* | 11/2019 | Wang ..................... G06N 3/006 |
| 2020/0076853 | A1 | 3/2020 | Pandian et al. |
| 2020/0128047 | A1 | 4/2020 | Biswas et al. |
| 2020/0159380 | A1 | 5/2020 | Wadikar et al. |
| 2020/0366699 | A1* | 11/2020 | Sampaio ............. H04L 63/0428 |
| 2020/0410403 | A1* | 12/2020 | Kamulete .............. G06N 5/003 |
| 2021/0037024 | A1 | 2/2021 | Brown |
| 2021/0037027 | A1 | 2/2021 | Brown et al. |
| 2021/0037035 | A1 | 2/2021 | Graul |

OTHER PUBLICATIONS

Extended European Search Report from the European Patent Office for U.S. Appl. No. 16/944,052, dated Dec. 18, 2020, a counterpart foreign application of U.S. Appl. No. 16/944,052, 9 pages.

Office Action for U.S. Appl. No. 16/943,755, dated May 5, 2021, Graul, "Visualization and Control of Remotely Monitored Hosts", 17 Pages.

Office Action for U.S. Appl. No. 16/944,052, dated Mar. 30, 2022, Brown, "Advanced Incident Scoring", 16 pages.

Office Action for U.S. Appl. No. 16/943,755, dated Apr. 4, 2022, Graul, "Visualization and Control of Remotely Monitored Hosts", 13 pages.

Extended European Search Report from the European Patent Office for U.S. Appl. No. 16/943,949, dated Dec. 10, 2020, a counterpart foreign application of U.S. Appl. No. 16/943,949, 10 pages.

Extended European Search Report from the European Patent Office for U.S. Appl. No. 16/944,033, dated Dec. 8, 2020, a counterpart foreign application of U.S. Appl. No. 16/944,033, 11 pages.

Kang, et al., "Parameter and quantile estimation for the generalized Pareto distribution in peaks over threshold framework", Journal of Korean Statistical Society, vol. 46, No. 4, Mar. 18, 2017, pp. 487-501.

Office Action for U.S. Appl. No. 16/943,755, dated Sep. 7, 2021, Graul, "Visualization and Control of Remotely Monitored Hosts", 13 Pages.

Office Action for U.S. Appl. No. 16/943,949, dated Jun. 22, 2022, Brown, Malicious Incident Visualization, 23 pages.

* cited by examiner

MAPPING UNBOUNDED INCIDENT SCORES TO A FIXED RANGE

The present application claims the benefit of U.S. Provisional Patent Application No. 62/882,339, filed on Aug. 2, 2019, which is incorporated herein by reference in its entirety as if fully set forth herein.

BACKGROUND

With computer and Internet use forming an ever greater part of day to day life, security exploits and cyberattacks directed to stealing and destroying computer resources, data, and private information are becoming an increasing problem. Some attacks are carried out using "malware", or malicious software. "Malware" refers to a variety of forms of hostile or intrusive computer programs that, e.g., disrupt computer operations or access sensitive information stored on a computer (e.g., viruses, worms, Trojan horses, ransomware, rootkits, keyloggers, spyware, adware, or rogue security software). Malware is increasingly obfuscated or otherwise disguised in an effort to avoid detection by security software. Determining whether a program is a malware or is exhibiting malicious behavior can thus be very time-consuming and resource-intensive.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
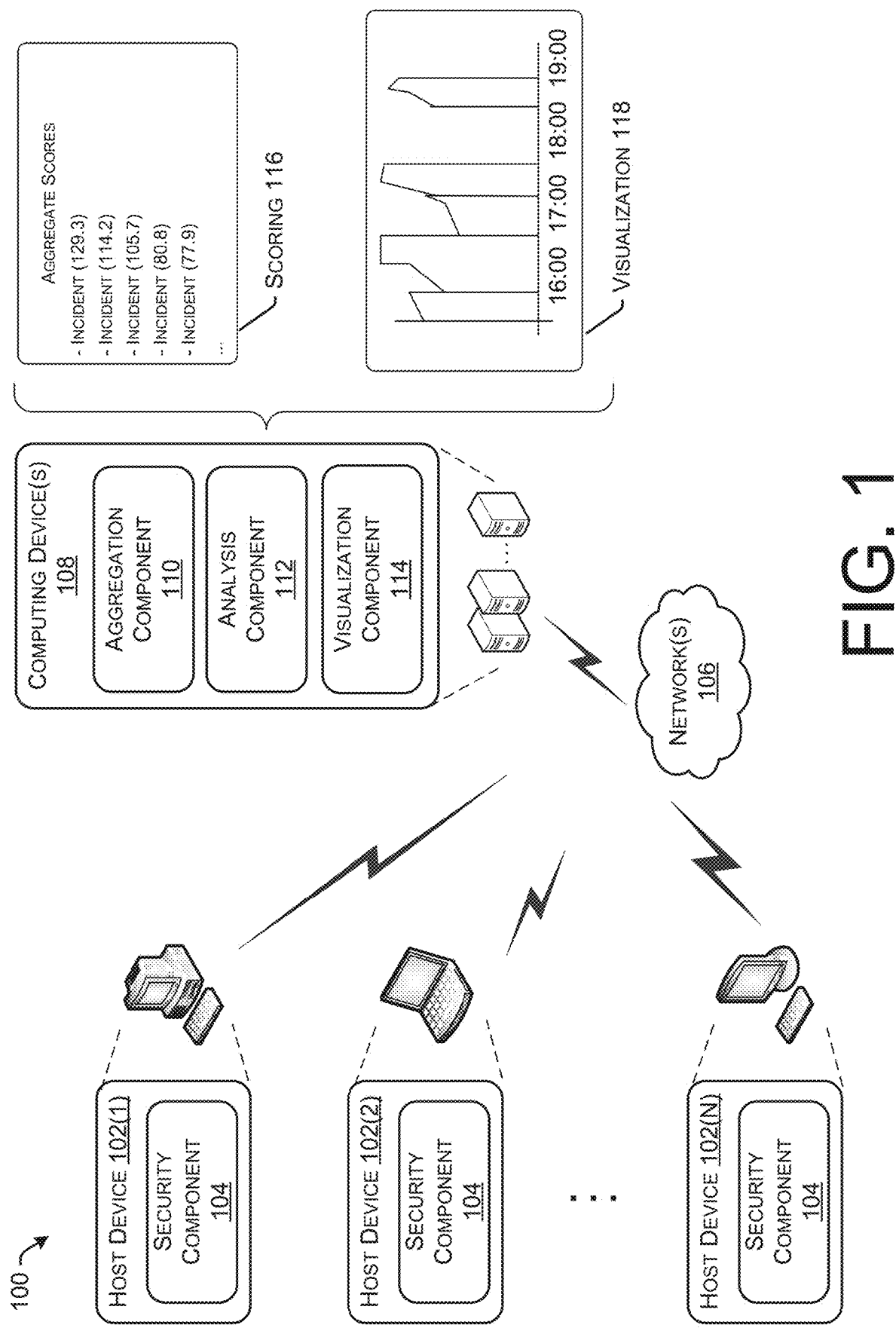
FIG. 1 illustrates an example system for a security service system that monitors a plurality of host devices and uses a security component to facilitate the collection of data for malicious incident detection, as described herein.

This disclosure describes, in part, techniques and systems for detecting possible malicious incidents associated with events processing on a host device, aggregating incident scores for the incidents based on an aggregation scheme, and mapping the incident scores to a fixed range. For example, a system can monitor the events (e.g., a process, a thread, and the like) detected on a host device and determine an incident is associated with the events indicating potential malicious behavior. The system may include detection and filtering techniques to collect data for the events. The system may determine an incident that includes one or more events and indicates a level of possible malicious behavior based on the events data. The system may determine an incident score associated with the incident.

In some examples, an incident may be determined from the events detected within a time interval. The incident may indicate that the monitored host device may or may not have been "compromised" by malicious behavior (e.g., adversarial activity, malware, etc.) based on the data collected from the detected events. The system may collect data for events performed by programs on the monitored host devices. The data may be analyzed to detect patterns from the events. A pattern is a particular event type that the system has observed as indicating potentially malicious activity.

In various examples, a pattern score may be based at least in part on a pattern aggregation and a pattern weight. The pattern aggregation may include a base score determined by aggregating a cluster of patterns occurring within a time interval. The pattern weight may include a surprisal value of the pattern and may indicate the importance of the information conveyed by the presence of the pattern based on a frequency of appearance. In some examples, the patterns that appear frequently may correlate with less useful information (e.g., information with low surprise value); conversely, patterns that appear infrequently may correlate with more useful information (e.g., information with a high surprise value). For instance, a first pattern appearing with a relatively high frequency may be associated with a lower surprisal value than a second pattern appearing infrequently. The pattern scores may be further modified by additional weights based on additional information detected by the system. For instance, if the system detects a particular pattern on multiple host devices at a similar time frame, the weight of the pattern score for that pattern may increase. The pattern scores may be aggregated by a predetermined time interval into an incident score.

In examples, the incident score may be compared to a threshold score to determine if an incident indicates malicious behavior. An incident is started when a rolling score first exceeds the threshold score and ended when the rolling score falls below the threshold score. The incident may be classified (e.g., based on event types) and tagged with additional information (e.g., timestamp) found in the data from the detected events and/or patterns. The incidents may be ranked by their incident scores to surface incidents with higher incident scores, which may indicate more signs of the device being "compromised" by malicious-behavior. Because unbound incident scores may deviate highly from a median incident score value, the system may map the unbounded incident scores to a fixed range for an analyst to review.

In various examples, the system may bin incident scores to a fixed range. The system may estimate a threshold beyond value for a mapping algorithm based on a distribution function of the incident scores. The threshold beyond value may be updated weekly or updated based on new patterns detected. The system may determine a minimum quantile value and a maximum quantile value for threshold estimation. The system may determine quantile steps between the minimum quantile value and the maximum quantile value for the threshold estimation. The system may determine the number of bins to map the incident scores and map the incident scores to bins.

In some examples, the system may determine an aggregate score from the incident scores based on an aggregation scheme. The aggregation scheme may indicate an aggregation level (e.g., device level, organization level, industry level, global level, etc.) for gathering events data. The aggregation scheme may also indicate an aggregation time interval (e.g., 1 year, 1 month, 2 weeks, 1 day, etc.) for gathering events data. The aggregation scheme may indicate a number for top scores and the aggregate score may be based on an average of the top scores. In some examples, the system may associate decay functions with incident scores when determining the aggregate score for an organization.

In various examples, the system may present scores and time graphs on a user interface for an analyst to review. The user interface may include activity graphs to show the progress of a past malicious event. In some examples, the user interface may present a time graph of an aggregate score for an organization. The user interface may include buttons and wizards to permit users to kill processes or isolate a computer from the network and/or to indicate that a remedial step has been performed with respect to an incident. In response to an indication of remedial step for an incident, the time graph of the aggregate score may decrease based in part on the remediated incident score. The user interface may include controls to tag incidents as true positive or false positive to create training data for detection models. The user interface may present notifications/dashboards of significant malicious events in progress and update the same when a new event rises in incident score into the top ranks (e.g., top 3, top 5, etc.). In various examples, once the system has determined that a particular host device is compromised within a confidence threshold, the user interface may present a notification for an analyst and/or automatically perform remedial steps.

A host device may install, and subsequently execute a security agent as part of a security service system to monitor and record events and patterns on a plurality of computing devices in an effort to detect, prevent, and mitigate damage from malware or malicious attack. Upon installation on a host device, the security agent may detect, record, and analyze events on the computing device, and the security agent can send those recorded events (or data associated with the events) to a security system implemented in the "Cloud" (the "security system" also being referred to herein as a "security service system," a "remote security service," or a "security service cloud"). At the security system, the received events data can be further analyzed for purposes of detecting, preventing, and/or defeating malware and attacks. The security agent resides on the host computing device, observes and analyzes events that occur on the host computing device, and interacts with a security system to enable a detection loop that is aimed at defeating all aspects of a possible attack.

In various examples, the security service system may also monitor similar detected activity patterns occurring at a similar time interval on multiple computing devices on a network. The multiple computing devices may belong to the same entity or different entities. Although the multiple computing devices, taken individually, may exhibit no obvious signs of an attack and the pattern may have a low pattern score, the security service system may increase the weight of this pattern thus increasing the pattern score base on detecting this similar pattern at a similar time on multiple computing devices. In additional examples, if a first pattern and a second pattern exhibit a secondary pattern of appearing together frequently, the first and second patterns may be grouped together as a nested pattern and scored as a nested pattern together. All the security information related to the events, the patterns, and the incidents from the devices may be gathered and presented to a security service analyst. The incidents may be scored, classified, and ranked to facilitate surfacing incidents having important information to convey, so the analyst can better analyze the detected incidents to determine if a device is under attack and to determine the type of attack based on the information.

Some examples herein relate to detecting malware or malicious behavior, e.g., by recording events performed by programs and analyzing distributions of types of those events. For brevity and ease of understanding, as used herein, "suspicious" refers to events or behavior determined using techniques described herein as being possibly indicative of attacks or malicious activity. The term "suspicious" does not imply or require that any moral, ethical, or legal judgment be brought to bear in determining suspicious events.

As used herein, the term "adversaries" includes, e.g., malware developers, exploit developers, builders, and operators of an attack infrastructure, those conducting target reconnaissance, those executing the operation, those performing data exfiltration, and/or those maintaining persistence in the network, etc. Thus the "adversaries" can include numerous people that are all part of an "adversary" group.

Some examples relate to receiving or processing event stream(s) or sequence(s) indicating activities of system components such as processes or threads. Many system components, including malicious system components, perform a particular group of operations repeatedly. For example, a file-copy program repeatedly reads data from a source and writes data to a destination. In another example, a ransomware program repeatedly encrypts a file and deletes the un-encrypted original. Some examples relate to detecting such repetitions. Some examples locate repeated groups of operations based on detected events, permitting malware detection without requiring disassembly or other inspection of the code for that malware.

The systems, devices, and techniques described herein can be implemented in a number of ways. Example implementations are provided below with reference to the following figures.

FIG. 1 illustrates an example system 100 for a security service system that monitors a plurality of host devices and uses a security component to facilitate the collection of data for malicious incident detection, as described herein. The system 100 may include host device(s) 102(1)-102(N) (individually and/or collectively referred to herein with reference 102), where N is any integer greater than or equal to 2, that interact with the computing device(s) 108 of the security service system over network(s) 106.

In some embodiments, the network(s) 106 may include any one or more networks, such as wired networks, wireless networks, and combinations of wired and wireless networks. Further, the network(s) 106 may include any one or combination of multiple different types of public or private networks (e.g., cable networks, the Internet, wireless networks, etc.). In some instances, the host device 102 and the computing device(s) 108 communicate over the network(s) 106 using a secure protocol (e.g., https) and/or any other protocol or set of protocols, such as the transmission control protocol/Internet protocol (TCP/IP).

The host device 102 (sometimes called "host computing device," "host machine," "endpoint," or "monitored computing device") may implement a security component 104, which is stored in a memory of the host device 102 and executable by one or more processors of the host device 102. The host devices 102 may be or include any suitable type of host devices 102, including, without limitation, a mainframe, a work station, a personal computer (PC), a laptop computer, a tablet computer, a personal digital assistant (PDA), a cellular phone, a media center, an embedded system, or any other sort of device or devices. An entity (sometimes called "organization," or "customer,") may be associated with the host devices 102, and the entity may have registered for security services provided by a service provider of the computing device(s) 108.

The security component 104 may, in some embodiments, be kernel-level security agents. Such kernel-level security agents may each include activity pattern consumers that receive notifications of activity patterns associated with execution activity patterns of their respective host device 102, filters, an activity pattern bus that route activity patterns to other agent module(s), correlators that track types of activity patterns, actors that gather state information and act upon activity patterns, and a situational model. The kernel-level security agents may each be installed by and configurable by the computing device(s) 108, receiving and applying while live, reconfigurations of agent module(s), and the agent situational model. Further, the kernel-level security agents may each output activity patterns to the computing device(s) 108, the activity patterns including the security-relevant information determined by the security component 104. The security component 104 may continue to execute on the host device 102 by observing and sending detected activity to the computing device(s) 108 while the host device 102 is powered on and running.

In some embodiments, the security component 104 may be connected to the computing device(s) 108 via a secure channel, such as a virtual private network (VPN) tunnel or other sorts of the secure channel and may provide activity patterns conveying security-relevant information to the computing device(s) 108 through the secure channel. The security component 104 may also receive configuration updates, instructions, remediation, etc. from the computing device(s) 108 via the secure channel.

The host devices 102 may receive the security component 104 over the network(s) 106 from the computing device(s) 108 by downloading the security component 104 as a software package to be installed on the host devices 102. Together, the security component 104 of the host devices 102 and the computing device(s) 108 form a detection loop, which can be enabled by an agent architecture designed in accordance with the principles of the well-known OODA-loop (i.e., observe-orient-detect-act-loop). The security component 104 may include components that receive notifications of semantically-interesting activity patterns (e.g., file writes and launching executables) from host operating system hooks or filter drivers, from user-mode activity pattern monitors, or from threads monitoring log files or memory locations. Thus, the security component 104 may observe activity patterns, determine actions to take based on those activity patterns, and/or send observed activity patterns to the computing device(s) 108 for further analysis at the computing device(s) 108.

The detected activity observed by the security component 104 may be sent over the network(s) 106 to the computing device(s) 108, with or without further processing by the security component 104. For example, in some embodiments, the detected activity observed by the security component 104 may be filtered using first configurable filters of the security component 104 to remove known safe activity patterns to help reduce the size of data transfer and then sent to the computing device(s) 108. Alternatively, the detected activity can be sent to the computing device(s) 108 without further filtering on the host devices 102.

A security component 104 of a host device 102 may trigger varying levels of containment for the host device 102 based on varying levels of suspicious activity patterns. In response to determining that the host device 102 is compromised (e.g., detected incident score is above threshold), the computing device(s) 108 can send a containment instruction over the network 106 to the host device 102. Upon receipt of this containment instruction, the security component 104 may cause the host device 102 to enable (activate, trigger, etc.) network containment. To enable network containment on the host device 102, the security component 104 can implement a firewall policy included with the security component 104. Upon enforcement of the firewall policy, a firewall of the host device 102 denies outgoing data packets from, and incoming data packets to, the host device 102 that would have been allowed prior to the implementation of the firewall policy. In some embodiments, the firewall policy may deny all traffic to and from the host device 102 with respect to other computing systems having remote network addresses (e.g., Internet Protocol (IP) addresses) that are not otherwise specified in the firewall policy as an exception for allowed traffic. In various embodiments, however, network containment can be implemented on the host device 102 in a manner that allows some communication to/from the host device 102 with the outside world over the network 106. For example, the firewall policy can specify exceptions for remote network addresses that are allowed to communicate with the host device 102 after containment is enabled/initiated and while the host device 102 remains contained. The firewall policy may allow some traffic to and from the computing device(s) 108 so that a communication channel remains open and usable between the host device 102 and the computing device(s) 108, even when the host device 102 is "contained" (or cutoff from communicating with the other host device(s) 102 besides the computing device(s) 108). To accomplish this result, the firewall policy can specify at least one remote network address (e.g., a remote IP address) associated with the computing device(s) 108, and may specify an action to allow outgoing data packets to, and incoming data packets from, the computing device(s) 108, which may be associated with the at least one remote network address that can be specified in the firewall policy. In some embodiments, the containment instructions may specify an action to block a specific suspicious activity pattern rather than trigger network containment if the suspicious activity pattern is limited in action.

In at least one configuration, the computing device(s) 108 may include any components that may be used to collect and analyze the observed activity patterns received from the host device(s) 102, to report on suspicious activity patterns, and to mitigate any malware or malicious code found in the host device(s) 102. For example, the computing device(s) 108 may include an aggregation component 110, an analysis component 112, and a visualization component 114.

The aggregation component 110 may receive and store any client entity information and their associated security information including observed activity patterns received from the security agent on the host device(s) 102. Additionally, the aggregation component 110 may gather data from various sources for use with other components. For example, the aggregation component 110 may gather enrichment data to help provide context to observed activity patterns. The aggregation component 110 may receive events detected from the host devices(s) 102 and may aggregate the events per device into a plurality of events.

The analysis component 112 may determine if the host device(s) 102 is potentially compromised. In some examples, the analysis component 112 may determine whether the host device(s) 102 is potentially compromised based on analyzing filtered data for activity patterns or unfiltered data for incident scores. The analysis component 112 may determine whether the activity patterns observed by the security component 104 are associated with malicious code or indicators of attack. In some examples, the analysis component 112 may analyze the observed activity patterns including cross-machine activities to determine if the connected host devices 102 are potentially compromised.

The analysis component 112 may identify patterns from events detected at the host device(s) 102. A pattern may include only a single event and is a particular type of event that indicates some suspicious (potentially malicious) activity was carried out. The patterns may be detected based on any predetermined criterion to identify detected events that indicate that one or more events of the plurality of events may indicate suspicious and/or potentially malicious activity was occurring. The predetermined criterion may include, but is not limited to, a predetermined number of repeated sequence(s) of events, any processes performed by detection component 206 and analysis component 112 to determine patterns of detected events, patterns of known malicious activity, and patterns of statistical significance including incident scores graph 300 and graph of mapping score to range 400 as discussed herein with reference to FIGS. 3, 4, and 5. In various examples, several detected events and/or detected patterns occurring together may imply a jointly higher statistical significance than each occurring separately. In the present example, the patterns can represent a single detected event or any repeated sequence of events that indicates malicious behavior. The analysis component 112 can detect a portion of the plurality of events including any read and write operations, and other operations, as a pattern. Examples are discussed herein, e.g., with reference to FIGS. 2-7.

In various examples, the aggregation component 110 and the analysis component 112 may detect patterns based on the predetermined criterion and aggregate the detected patterns by pattern types using pattern identifiers. In some examples, the patterns aggregated by identifiers and/or types may identify patterns that are distinct or similar. In additional examples, the analysis component 112 may determine a total pattern count for the total number of non-distinct patterns detected in the plurality of events, determine a pattern specific count for each pattern aggregated by pattern type, and determine a pattern score for each pattern. In additional examples, the analysis component 112 may determine the pattern score for each pattern using different time intervals (e.g., 30 minutes, 1 hour, 24 hours, 1 week, 1 month, etc.) and store the scores as historical data for the different time intervals.

In some examples, analysis component 112 can determine pattern scores based on quantifying the amount of statistically significant information in the patterns detected from events in the plurality of events. As described herein, the analysis component 112 may determine a pattern score based at least in part on a pattern aggregation and a pattern weight. The pattern aggregation may include a base score determined by aggregating a cluster of patterns occurring within a time interval. The pattern weight may include a surprisal value of the pattern and may indicate the importance of the information conveyed by the presence of the pattern based on a frequency of appearance. In some examples, the patterns that appear frequently may correlate with less useful information (e.g., information with low surprise value); conversely, patterns that appear infrequently may correlate with more useful information (e.g., information with a high surprise value).

The analysis component 112 can determine a pattern distribution of the frequency of each pattern, in which the pattern frequencies are sorted from highest frequency to lowest frequency. As described herein, the patterns may be scored based on an aggregation scheme including at individual hosts level, organization level, industry level, and/or global level (e.g., based on a network, a geographic area, etc.). The analysis component 112 may score patterns based on frequency distributions, which can be correlated with the statistical significance of information conveyed by the occurrence of the patterns. For instance, patterns that occur frequently may correlate with less useful information, conversely, patterns that occur infrequently may correlate with more useful information. In various examples, the base pattern score for an associated pattern type may be inversely correlated with its frequency. For instance, a first pattern that occurs frequently may have a low pattern score, while a second pattern that occurs infrequently may have a high pattern score.

In various examples, the analysis component 112 can determine pattern scores based on one or more information quantifying models. As a non-limiting example, the pattern scores may be determined as "surprisal values" based on information theory and may assume using base-2 logs, and the result is a measure of the information content of pattern presence in bits. That is: $\log 2(1/P(dt))$ or more simply $-\log 2(P)$, where $P(dt)$ is the probability that a randomly selected detection d is of type t. The detection d being of type t in this system is analogous to the Pi term in the surprisal equation formulated as: $I(E):=-\log[Pr(E)]=-\log(P)$.

Additionally, and/or alternatively, assuming events E are independent, the events E can be summed in log space which is homomorphic with multiplying them in scalar space. Accordingly, the surprisal values can be aggregated as: $-i \log(Pi)$. In some examples, the analysis component 112 can determine that some detected patterns ("detects") have some probable relationship, for example, occurring clustered during a predetermined time interval on a particular host device, thus the pattern scores as determined by surprisal values can be summed to quantify the amount of information conveyed by the combination of detects. The analysis component 112 may determine an "incident" from this combination of detects and the sum of the surprisal values may be an "incident score."

In additional and/or alternate examples, the base pattern score may be adjusted by a weight based on additional information. For example, the analysis component 112 can consult a pattern catalog to determine whether the pattern matches a known-good or known-bad pattern, a known-bad pattern would increase the weight to increase the pattern score and decrease the weight to decrease the pattern score for a known-good pattern. In an additional example, if the security system detects a similar pattern on multiple hosts at a similar time frame, the weight of the pattern score for that pattern may increase.

In some examples, analysis component 112 may determine the incident score based on the sum of the pattern scores for patterns detected in the plurality of events. The analysis component 112 may repeat determining the incident score by repeating the summation of pattern scores during a predetermined time interval. For instance, if the predetermined time interval is one hour, then at 7 o'clock, the incident score may be a summation of all pattern scores from 6:00-7:00. The incident score may or may not indicate that an incident is occurring. For instance, if the incident score is below a threshold score, it may not be associated with an incident, but if the incident score meets or exceeds a threshold score, then it may be related to an incident. The analysis component 112 can determine the incident score associated with an incident based on one or more scoring schemes, including, but not limited to: aggregating pattern scores associated with all detected patterns comprising the incident; or the maximum observed incident score during the incident's timespan. In various examples, the incident score can include total counts or percentages of all pattern types.

In some examples, analysis component 112 can determine that the plurality of events is associated with an incident indicating malicious behavior based on the incident score. In various examples, the determination may be based on one or more of: comparing incident scores to historical incident scores (e.g., compared to score from a week, a month, or a year ago, etc.), comparing the incident score to a predetermined threshold score, or ranking the incident scores and selecting a predetermined number of top incident scores to present to an analyst for further review. The analysis component 112 may create an incident by determining the start time and end time for an incident timespan. A newly created incident may be in an open state at a start time when the incident score initially meets or exceed a predetermined score threshold and in a closed state at an end time when the incident score falls below the predetermined score threshold. During the intervening time, an incident can be updated to include newly detected patterns and its incident score may change.

In various examples, remediation actions are taken with respect to hosts (one or more) having scores above a predetermined threshold. For example, such hosts can be remotely rebooted, shut down, or disconnected from the network, or another local or remote management operation can be taken with respect to those hosts.

The visualization component 114 may enable a security analyst (also referred to as an administrator, support personnel, etc.) associated with the computing device(s) 108 to view alerts based on incidents detected and visualization of the incidents, alerts pertaining to host devices 102 that have been compromised, and to make decisions regarding appropriate responses to those incident detections and alerts.

In a non-limiting example, the visualization component 114 may present example ranked incident scores 116 and example ranked visualization 118. The example ranked incident scores 116 may present a predetermined number of incidents with the highest incident scores (e.g., top 10 or top 5) occurring within a predetermined time period (e.g., within 24 hours). The example visualization 118 may present an example time series graph representing the example ranked incident scores 116 to provide a visual aid to permit the security analyst to view incidents most likely indicating malicious behavior. The example time-series graph may present additional information for the incidents including the time interval and patterns with high pattern scores. The example visualization 118 may present the alerts with visualization for the group of activity patterns and the aggregated scores with the risk assessment results.

Figure 2:
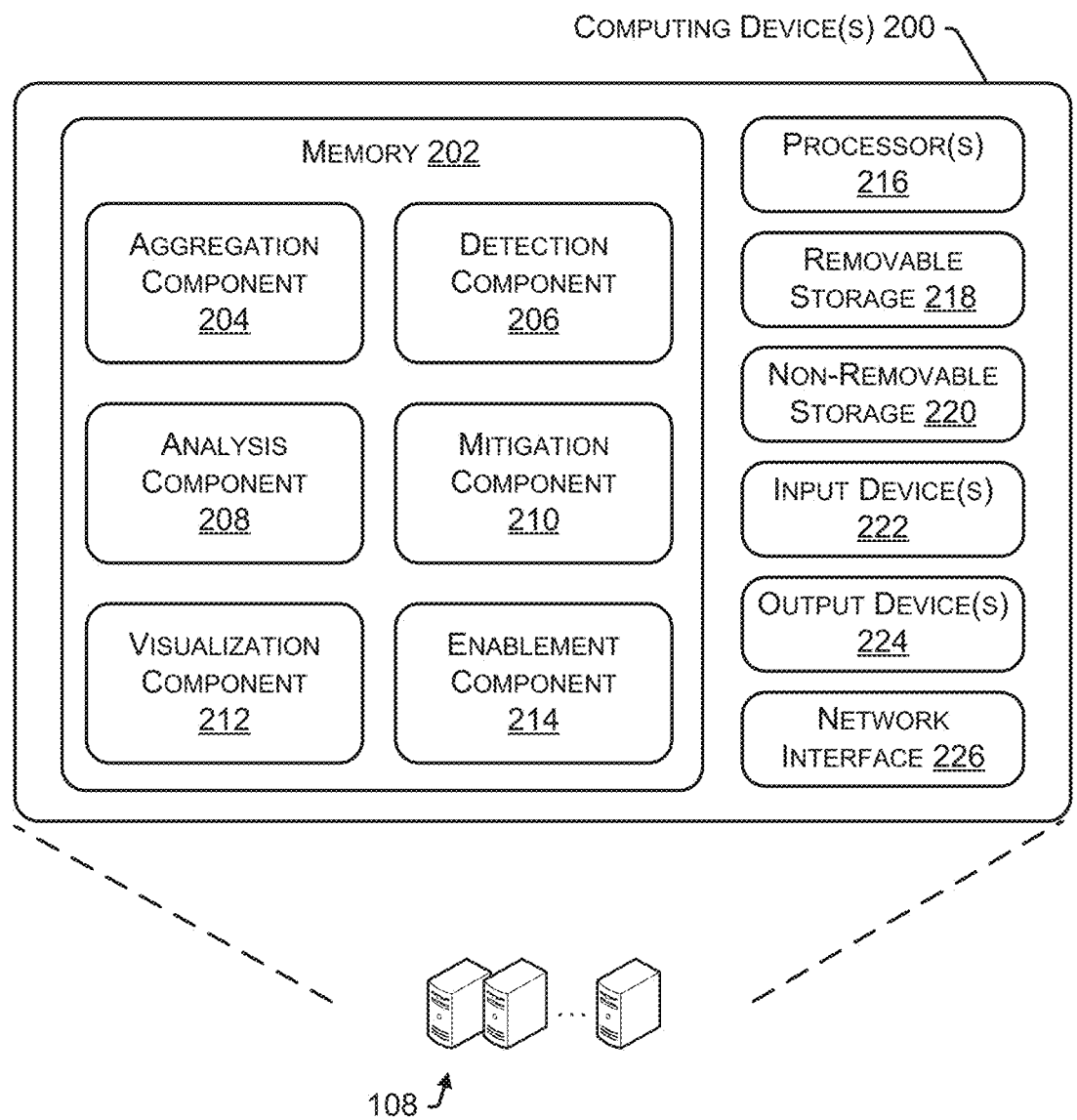
FIG. 2 is a block diagram of an illustrative computing architecture of the computing device(s) shown in FIG. 1.

FIG. 2 is a block diagram of an illustrative computing architecture of the computing device(s) 200. In some embodiments, the computing device(s) 200 can correspond to the computing device(s) 108 of FIG. 1. It is to be understood in the context of this disclosure that the computing device(s) 200 can be implemented as a single device or as a plurality of devices with components and data distributed among them. By way of example, and without limitation, the computing device(s) 200 can be implemented as various computing devices 200(1), 200(2), . . . , 200(N).

As illustrated, the computing device(s) 200 comprises a memory 202 storing an aggregation component 204, a detection component 206, an analysis component 208, a mitigation component 210, a visualization component 212, and an enablement component 214. Also, the computing device(s) 200 includes processor(s) 216, a removable storage 218 and non-removable storage 220, input device(s) 222, output device(s) 224, and network interface 226.

In various embodiments, memory 202 is volatile (such as RAM), non-volatile (such as ROM, flash memory, etc.) or some combination of the two. The aggregation component 204, a detection component 206, an analysis component 208, a mitigation component 210, a visualization component 212, and an enablement component 214 stored in the memory 202 can comprise methods, threads, processes, applications or any other sort of executable instructions. The aggregation component 204, a detection component 206, an analysis component 208, a mitigation component 210, a visualization component 212, and an enablement component 214 can also include files and databases.

In various embodiments, the computer-readable memory 202 generally includes both volatile memory and non-volatile memory (e.g., RAM, ROM, EEPROM, Flash Memory, miniature hard drive, memory card, optical storage, magnetic cassettes, magnetic tape, magnetic disk storage or other magnetic storage devices, or any other medium). The computer-readable memory 202 may also be described as computer storage media or non-transitory computer-readable media and may include volatile and nonvolatile, removable and non-removable media implemented in any method or technology for storage of information, such as computer-readable instructions, data structures, program modules, or other data. Computer-readable storage media (or non-transitory computer-readable media) include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, and the like, which can be used to store the desired information and which can be accessed by the security service system. Any such memory 202 may be part of the security service system.

The aggregation component 204 may receive and store any client entity information and their associated security information including observed activity patterns received from the security component 104 on the respective host device(s) 102. The aggregation component 204 may gather data from other components that may be stored in a data store. In some embodiments, the aggregation component 204 may gather and store data associated with known information, such as domain information that is associated with known entities, for use as enrichment data by the visualization component 212.

In some examples, the aggregation component 204 may gather data for an aggregate score based on an aggregation scheme. The aggregation component 204 may interact with the analysis component 208 to determine the aggregate score from the incident scores based on the aggregation scheme. The aggregation scheme may indicate an aggregation level (e.g., host device, organization, industry, global, etc.) for gathering events data. The aggregation scheme may also indicate an aggregation time interval (e.g., 1 year, 1 month, 2 weeks, 1 day, etc.) for gathering events data. The aggregation scheme may indicate a number for top scores and the aggregate score may be based on an average of the top scores. In some examples, the aggregation component 204 may associate decay functions with incident scores when determining the aggregate score for an organization.

In some instances, the aggregation component 204 can correspond to the aggregation component 110 of FIG. 1.

The detection component 206 may receive unprocessed or partially processed activities data from the security component 104. As previously discussed, the activity patterns observed by the security component 104 may be filtered using first configurable filters of the security component 104 to remove known safe activity patterns to help reduce the size of data transfer or the activity patterns may be sent to the security service system without further processing on the host device(s) 102. The detection component 206 may have one or more configurable filters including filtering rules set by the analyst.

In some embodiments, the detection component 206 may also maintain and utilize one or more situational models, such as models specific to an individual host device(s) 102, to types of computing devices, to entities, or to a generic device to determine which activity patterns are "interesting" and may warrant additional analysis from the analyst. For example, while a host A machine remoting into a host B machine to run an executable file may be an "interesting" event, if the host A machine ran the same file on a hundred machines belonging to the same entity, this may be normal administrative behavior. Thus, the detection component 206 may filter the observed activity patterns received from security component 104 to remove the many legitimate user activity patterns to isolate "interesting" filtered activity patterns. The security service system may update these models based on the received notifications and utilize the models in analyzing the interesting activity patterns. In some embodiments, the detection component 206 may utilize a machine learning model (or algorithm) that is trained on a past corpus of activity patterns and detected malware attacks/intrusions on the host device(s) 102 that utilized the security service system. Such a machine learning model is configured to process activity patterns received from a host device(s) 102 as input, and to generate an output of filtered activity patterns that are utilized by components of the security service system in analyzing the severity of the threat on the host device(s) 102.

Machine learning generally involves processing a set of examples (called "training data") in order to train the machine learning model(s). A machine learning model, once trained, is a learned mechanism that can receive new data as input and estimate or predict a result as output. For example, a trained machine learning model can comprise a classifier that is tasked with classifying unknown input (e.g., an unknown activity patterns) as one of the multiple class labels (e.g., a class label of "compromised" vs. "uncompromised", "high severity level" vs. "low severity level", etc.). Any single machine learning model, or an ensemble of base-level machine learning models, can be used for this purpose, including, without limitation, tree-based models, support vector machines (SVMs), kernel methods, neural networks, random forests, splines (e.g., multivariate adaptive regression splines), hidden Markov model (HMMs), Kalman filters (or enhanced Kalman filters), Bayesian networks (or Bayesian belief networks), expectation-maximization, genetic algorithms, linear regression algorithms, nonlinear regression algorithms, logistic regression-based classification models, or an ensemble thereof. An "ensemble" can comprise a collection of machine learning models whose outputs (predictions) are combined, such as by using weighted averaging or voting. The individual machine learning models of an ensemble can differ in their expertise, and the ensemble can operate as a committee of individual machine learning models that is collectively "smarter" than any individual machine learning model of the ensemble.

In some embodiments, the detection component 206 may classify the severity level for the filtered activity depending on the activity pattern type, based on whether that particular activity pattern type is a stronger indication of attack. That is, an activity pattern with explicit threat data showing obvious suspicious activity pattern on a remote system may be classified as a high severity level, while an activity pattern with inferred threat data showing signs of suspicious activity pattern may be classified as a medium severity level. For instance, an activity pattern with explicit data showing that Host A remoted into Host B, and is running multiple data gathering commands with lateral movement or is downloading suspicious files and scheduling tasks to run the files, may be classified as high severity level.

The analysis component 208 may determine if the host device(s) 102 is potentially compromised. Determining whether the host device(s) 102 is potentially compromised may include determining whether the activity patterns observed by the security component 104 are associated with malicious code or indicators of attack. In some embodiments, the analysis component 208 may analyze the observed activity patterns that include cross-machine activity patterns to determine if the host device(s) 102 are potentially compromised. In various embodiments, the analysis component 208 may analyze the observed activity patterns within a predefined time period that may be set to a default time period and may be modified by the analyst. The analysis component 208 may store all activities data as historical data that may be accessed by the analyst for further analysis.

In some instances, the analysis component 208 can correspond to the analysis component 112 of FIG. 1. In various examples, the analysis component 208 can generate a mapping algorithm to map incident scores to a fixed range and will be discussed herein with respect to FIGS. 4 and 5.

The analysis component 208 may further aggregate incident scores to provide a better overview of the situation. The analysis component 208 determines a fidelity value for each of the devices 102 based at least in part on the filtered activity patterns from the detection component 206, the time period of the observed activity pattern, and the classification of severity level. If the fidelity value is above a predetermined severity threshold, an alert for an analyst may be generated for further analysis. In some embodiments, the fidelity value for a host device may be based on the cardinality of the set of interesting activity patterns associated with the host device within a predefined time period. That is, the fidelity value is the number of activity patterns in the set. Additionally and/or alternatively, the fidelity value for a host device may be based on the severity level of the filtered activity patterns associated with the host device, such that if even one of the activity patterns is classified as high severity level, the fidelity value may be set to a value higher than the predetermined severity threshold. In various embodiments, the severity levels may be assigned a corresponding weight, and the fidelity value may be a tally of the activity patterns modified by the weight. In some embodiments, the analysis component 208 may increase a first fidelity value on a first host device by at least a portion of a second fidelity value of a second host device that is acting remotely on the first host device. Additionally, and/or alternatively, host devices with "interesting" remoting activity patterns between them may be grouped together into a group of activity patterns and a fidelity value may be determined for the group. The group fidelity value may be based on the highest fidelity value for any one device in the group, or may be based on the cardinality of the set of filtered activity patterns associated with all the devices in the group.

The mitigation component 210 may generate alerts for an analyst to further investigate a possible attack on a device 102 or generate notifications of interesting activity patterns that need further analysis. Additionally, to help draw attention to high severity level activity patterns or activity pattern groups, the mitigation component 210 may establish a threat alert priority scheme to help prioritize the presentation of activity patterns and alerts. The threat alert priority scheme may be based on the fidelity value, severity level, alert timeline, or any combination thereof. For example, the activity patterns and alerts may be ranked according to their severity level, followed by fidelity values, so that the activity patterns and alerts with highest severity level are presented first, sorted by the highest fidelity values first; then the next severity level is presented, sorted by the highest fidelity values first.

Figure 3:
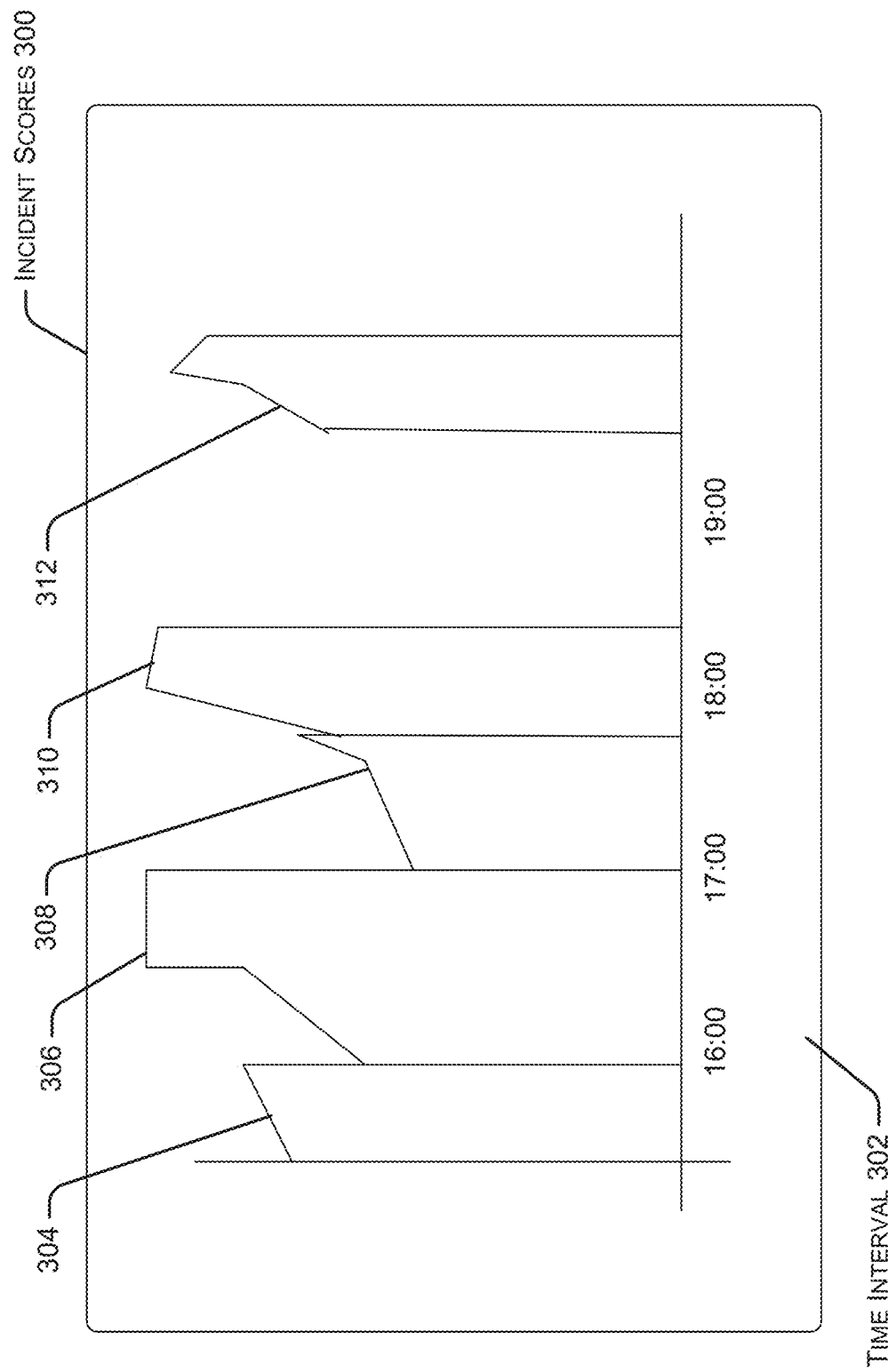
FIG. 3 illustrates an example visualization for malicious incident detection by scoring events.
Figure 4:
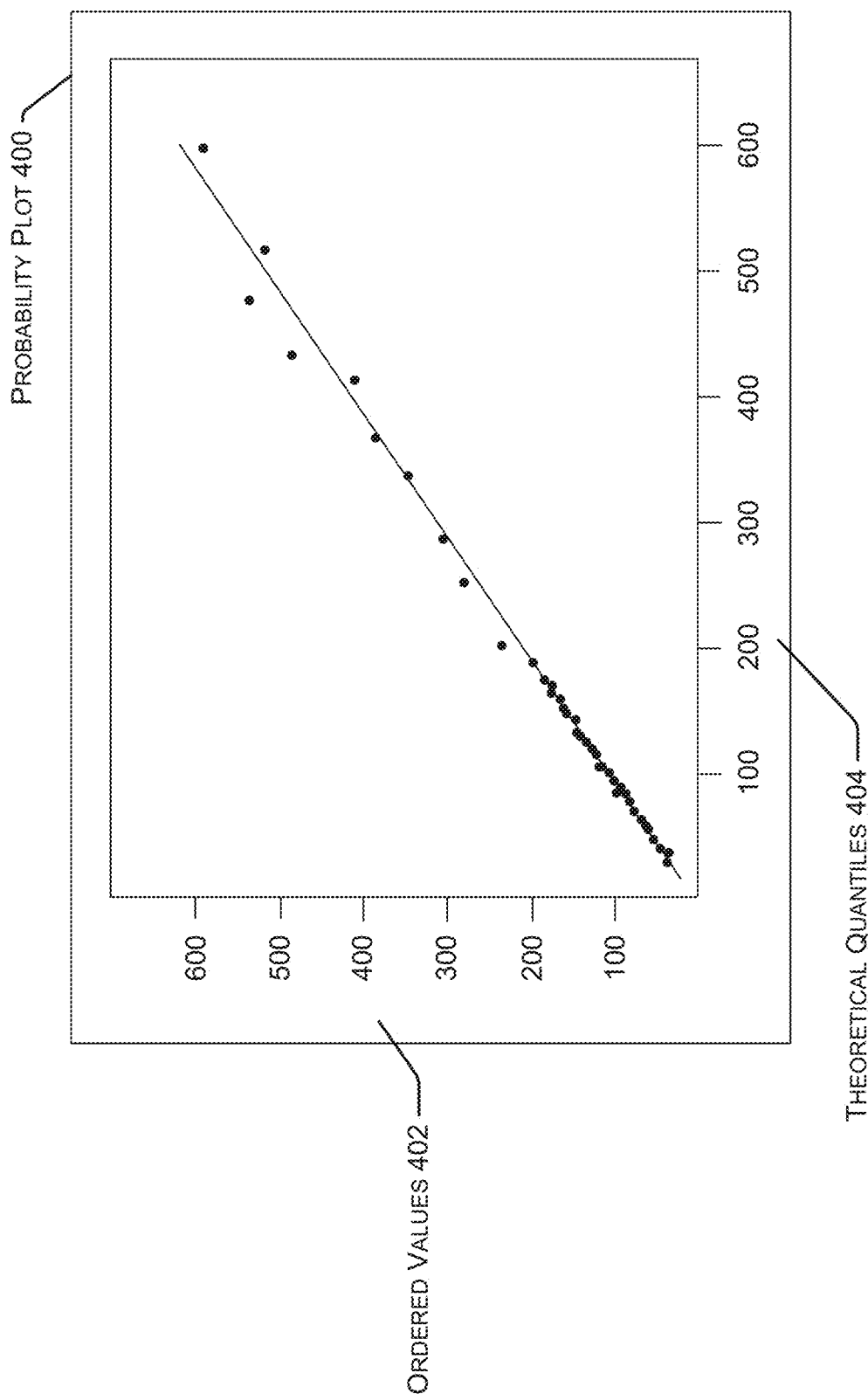
FIG. 4 illustrates an example visualization for mapping incident scores to a fixed range.
Figure 5:
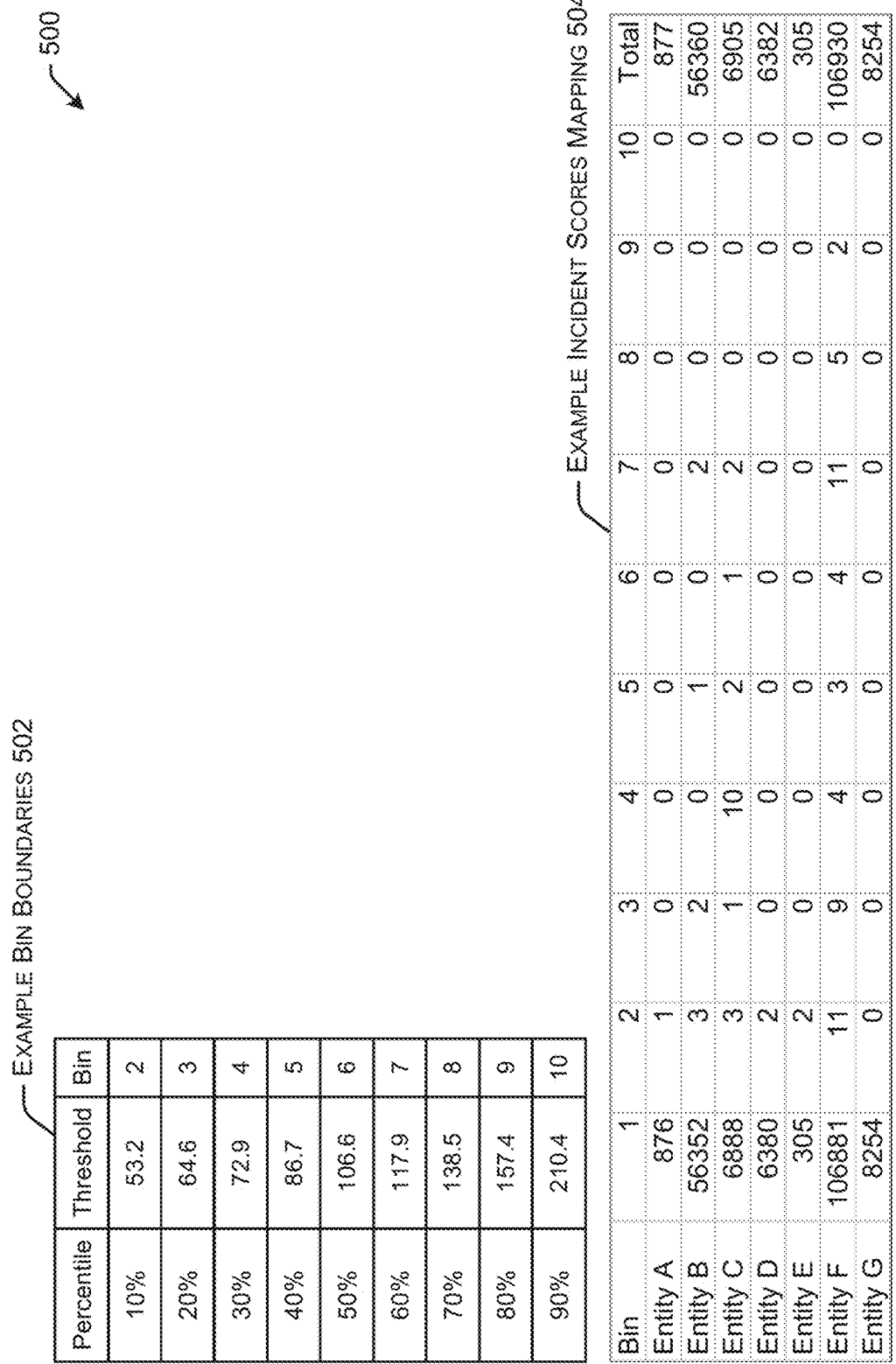
FIG. 5 illustrates example visualizations for example threshold range and mapping incidents.

The visualization component 212 may enable an analyst, who is associated with the security service system, to view notifications of observed activity patterns, alerts pertaining to the host device(s) 102 that have been compromised, and make decisions regarding appropriate responses to those activity patterns and alerts. Examples of graphs and user interface generated by the visualization component 212 are shown in FIGS. 3-5, which presents multiple graphical representations of alerts for "machines" corresponding to host device(s) 102 that are currently being monitored via the detection loop between security component 104 and the security service system, as described herein.

In various examples, the visualization component 212 may generate graphs that map unbounded incident scores to a fixed range for an analyst to review. In some examples, the visualization component 212 may remotely store activity graphs of the compromised host device as subgraphs and may connect subgraphs to activity on a different device or before/after a reboot of the compromised host device. By visually connecting to the subgraphs to updated activity graphs, the visualization component 212 may indicate the movement of malicious activity.

The visualization component 212 can present an alert indicating that a particular host device(s) 102 have been potentially compromised. These alerts may be based on the respective activity patterns observed by the respective security component 104 executing on those host device(s) 102, which activity patterns may have been determined to be associated with malicious code. It is to be appreciated that the visualization component 212 may also enable the analyst to examine activity patterns and associated data without first providing an alert.

The visualization component 212 may further present a selection element that, upon selection, provides further details pertaining to the alert, indicating a particular host device(s) 102 has been compromised. By selecting the particular host device(s) 102, the analyst can get detailed information as to the particular observed activity patterns, processes executing on the host device(s) 102 relating to those activity patterns, and/or other details about the potentially compromised host device(s) 102.

In various examples, the visualization component 212 may present the historical data associated with the particular host device(s) 102 for the analyst to perform further analysis. The visualization component 212 may present a timeline selection element that, upon selection, provides details pertaining to the historical activity patterns during a selected time period. In some examples, the visualization component 212 may present a log of any cross-machine activities for the selected time period. The visualization component 212 may present indicators within or over the timeline selection element to indicate certain activity pattern types to aid the analyst in identifying certain activity patterns.

The visualization component 212 may further present selection elements that, upon selection, to automatically generate a client report by populating at least a portion of a client report including some of the augmented data for the client entity associated with the host device(s) 102 in question. In some embodiments, the analyst may complete the remaining client report before sending the report to the host device(s) 102 or entity associated with the host device(s) 102. In this example, there may be instances where the analyst notices an alert of a potentially compromised host device(s) 102 in the visualization component 212, but after further inspection (e.g., by viewing further details about the activity pattern on the host device(s) 102), the analyst may determine, above some threshold level of confidence, that the host device(s) 102 is actually, or most likely, not compromised by malware, and may decide to refrain from reporting the host device(s) 102.

In other embodiments, the visualization component 212 may be configured to determine to surface a particular host device(s) 102 automatically (i.e., without human intervention), and may send non-confidential activity patterns alert to the particular host device(s) 102 without human intervention as well. For example, as discussed above, if the mitigation component 210 has determined that the fidelity value for a Host A device is extremely high, the visualization component 212 may alert the client entity associated with Host A device to begin taking at least some remedial actions on their devices. Additionally, an activity patterns notification that a remote activity pattern has been observed on Host B device may be automatically sent to the associated client entity. The visualization component 212 may present the alerts and notifications to the client entity utilizing any communication channel, such as an e-mail message, a website associated with the security service system, a text message, a push notification, a social network site, an application that is associated with the security service system and that resides on the device(s) 102 associated with the client entity.

In some instances, the visualization component 212 can correspond to the visualization component 114 of FIG. 1.

The enablement component 214 may communicate with the security component 104 of the host device(s) 102, and to evaluate suspicious activity patterns identified by the security component 104. For example, the security service system may be configured to receive activity patterns and data related to such activity patterns, such as forensic data associated with observed activity patterns. Upon receiving notification of an interesting activity pattern from a security component 104, the enablement component 214 may determine if related notifications have been received from other security component 104 of other host device(s) 102. Additionally, and/or alternatively, the enablement component 214 may evaluate the interesting activity pattern based on one or more rules or heuristics. The enablement component 214 may determine that an interesting activity pattern may be associated with malicious attack based on these determinations and evaluations and may, in response, perform any or all of generating an activity pattern and providing the activity pattern to host device(s) 102 (e.g., for containment purposes, and/or diagnostic, healing, or other purposes), sending updates (e.g., a new version of the security component 104, new signatures, new firewall policies, etc.), instructing the host device(s) 102 to perform a remediation action to heal the host device(s) 102 or otherwise counter malicious code. In various embodiments, the enablement component 214 may send a containment instruction, to a security component 104 residing on a host device(s) 102, to specify an action to block a specific "interesting" activity pattern observed. For example, if the enablement component 214 determines that there is a malicious process running cross-machine between a host device(s) 102, the enablement component 214 may send instructions to block that activity pattern. In some embodiments, if the same malicious process is observed on multiple devices, the enablement component 214 or another component of the security service system may dynamically generate a new policy specifying an action to block the specific activity pattern and send the new policy to the security component 104 residing on another host device(s) 102 belonging to a certain In some instances, any or all of the devices and/or components of the computing device(s) 200 may have features or functionality in addition to those that FIG. 2 illustrates. For example, some or all of the functionality described as residing within any or all of the computing device(s) 200 of the security service system may reside remotely from that/those computing device(s) 200, in some implementations.

The computing device(s) 200 may be configured to communicate over a telecommunications network using any common wireless and/or wired network access technology. Moreover, the computing device(s) 200 may be configured to run any compatible device operating system (OS), including but not limited to, Microsoft Windows Mobile, Google Android, Apple iOS, Linux Mobile, as well as any other common mobile device OS.

The computing device(s) 200 also can include input device(s) 222, such as a keypad, a cursor control, a touch-sensitive display, voice input device, etc., and output device(s) 224 such as a display, speakers, printers, etc. These devices are well known in the art and need not be discussed at length here.

As illustrated in FIG. 2, the computing device(s) 200 also includes the network interface 226 that enables the computing device(s) 200 of the security service system to communicate with other computing devices, such as any or all of the host device(s) 102.

FIG. 3 illustrates an example graph for malicious incident detection by scoring events, as discussed herein. In some instances, the example graph can be represented as example incident scores 300.

In a non-limiting example, the example incident scores 300 may present an example time series graph representing the ranked incident scores to provide a visual aid to permit the security analyst to view incidents most likely indicating malicious behavior. The example time-series graph may present additional information for the incidents 304, 306, 308, 310, and 312 including the time interval 302 and patterns with high pattern scores. The example incident scores 300 may present the alerts with visualization for the group of activity patterns.

An incident may be detected from the events detected within a time interval. The incident may indicate that the monitored host device may or may not have been "compromised" by malicious behavior (e.g., adversarial activity, malware, etc.) based on the information gathered from the detected events. Initially, the system may gather data for events performed by programs on a monitored host device. The data may be analyzed to detect patterns in the events. The patterns may be scored based on the importance of information conveyed by the presence of the patterns based on a frequency of appearance. In various examples, patterns that appear frequently may correlate with less useful information (e.g., information that is relatively less likely to permit detecting a malicious incident); conversely, patterns that appear infrequently may correlate with more useful information (e.g., information that is relatively more likely to permit detecting a malicious incident). For instance, a first pattern appearing with a relatively high frequency may receive a lower pattern score than a second pattern appearing infrequently. The pattern scores may be adjusted by weights based on additional information detected by the system. For instance, if the system detects a similar pattern on multiple devices at a similar time frame, the weight of the pattern score for that pattern may increase. The pattern scores may be aggregated by a predetermined time interval into an incident score. The incident score may be compared to a threshold score to determine if an incident indicating malicious behavior is occurring. An incident is started when the incident score first exceeds the threshold score and ends when the incident score falls below the threshold score. The incident may be classified (e.g., based on event types) and tagged with additional information found in the data from the detected events and patterns. The incidents may be ranked by their incident scores to surface incidents with higher incident scores, which may indicate more signs of the device being "compromised" by malicious-behavior.

In some examples, the analysis component 208 can determine that the plurality of events is associated with an incident indicating malicious behavior based on the incident score. In various examples, the determination may be based on one or more of: comparing incident scores to historical incident scores (e.g., compared to score from a week, a month, or a year ago, etc.), comparing the incident score to a predetermined threshold score, or ranking the incident scores and selecting a predetermined number of top incident scores to present to an analyst for further review. The analysis component 208 may create an incident by determining the start time and end time for an incident timespan. A newly created incident may be in an open state at a start time when the incident score initially meets or exceed a predetermined score threshold and in a closed state at an end time when the incident score falls below the predetermined score threshold. During the intervening time, an incident can be updated to include newly detected patterns and its incident score may change.

In the present example, the incidents represented by the example time-series graph may include detected incidents 304, 306, 308, 310, and 312. There may be a time interval between 18:00 and 19:00 (between incidents 310 and 312) where the incident score for the detected events did not exceed the threshold score. The incident scores for each of the five incidents may be ranked and/or aggregated with other incident scores within a predetermined score time (e.g., a day, a week, etc.).

In some instances, the example incident scores 300 can be generated by the detection component 206 and analysis component 208, as discussed herein. Of course, the example graphs are not limited to example incident scores 300.

FIG. 4 illustrates an example graph for mapping unbounded incident scores to a fixed range, as discussed herein. In some instances, the example probability plot 400 can be represented as an example mapping score to the range.

As discussed herein, the analysis component 208 may determine incident scores as the sum of the surprisal value of each unique detect within the incident. Accordingly, the incident scores may have no strict upper bound and the relative significance of scores may be difficult to interpret. The mapping of incident scores to a linear finite scale enables the comparing of scores with a large difference in magnitude.

The analysis component 208 may apply the Extreme Value Theory (EVT) to analyze data with large deviations from the median. In various examples, the EVT data in the tails of a distribution can be modeled using a Generalized Pareto Distribution. The system may apply EVT to incident score, data threshold was used to make an estimate of a threshold above which the data follows a Generalized Pareto Distribution (GPD). The example probability plot 400 shows of the distribution of threshold above values to a GPD. To scale incident score values, a threshold above value is estimated, the distribution of extreme values is determined and mapped to a linear range. For instance, the example probability plot 400 may indicate "QQ Plot of Above Threshold Data to Pareto Distribution" and may map ordered values 402 to theoretical quantiles 404.

In some instances, the example probability plot 400 may be generated by the analysis component 208 and visualization component 212, as discussed herein. Of course, the example graphs are not limited to example probability plot 400.

FIG. 5 illustrates an example visualization for example threshold range and mapping incidents. In some instances, the example visualization 500 can include an example bin boundaries 502 and an example incident scores mapping 504.

In some instances, the visualization component 212 can present a user interface to represent various activity graphs including example bin boundaries 502 and example incident scores mapping 504. Further, the example visualization 500 can represent various incident data detected on a plurality of host devices associated with Entities A-G, as discussed herein.

In the present example, the analysis component 208 may determine a mapping algorithm. Initially, the analysis component 208 may estimate a threshold above value based on a distribution function of the incident scores. The system may determine a minimum quantile value and a maximum quantile value for the threshold estimation. The system may determine the quantile steps between the minimum quantile value and the maximum quantile value for the threshold estimation. The system may determine the number of bins to map the incident scores and map the incident scores to the bins.

In the present example, the analysis component 208 may determine to use 45 as the estimated threshold above and 10 for bins. The analysis component 208 may apply the mapping algorithm to generate the example bin boundaries 502.

The example bin boundaries 502 indicates the bins and the threshold range for each bin. Any scores below the first quantile value of 53.2 are placed in the first bin. Any scores above the last quantile threshold of 210.4 are placed in the last bin.

The example incident scores mapping 504 illustrates example customers Entity A-Entity G. As to be expected, a majority of the incident scores are mapped to the first bin. By mapping the incident scores to the bins, the incident scores with statistical significance can be easily spotted. For instance, Entity F has a number of high scoring incidents in bins 8 and 9 and should be reviewed immediately. Additionally, Entity B and Entity C have incidents mapped to bin 7 and should be flagged for review.

In some instances, the example visualization 500 can be generated by the visualization component 212, as discussed herein. Of course, the example visualizations are not limited to the example visualization 500.

Figure 6:
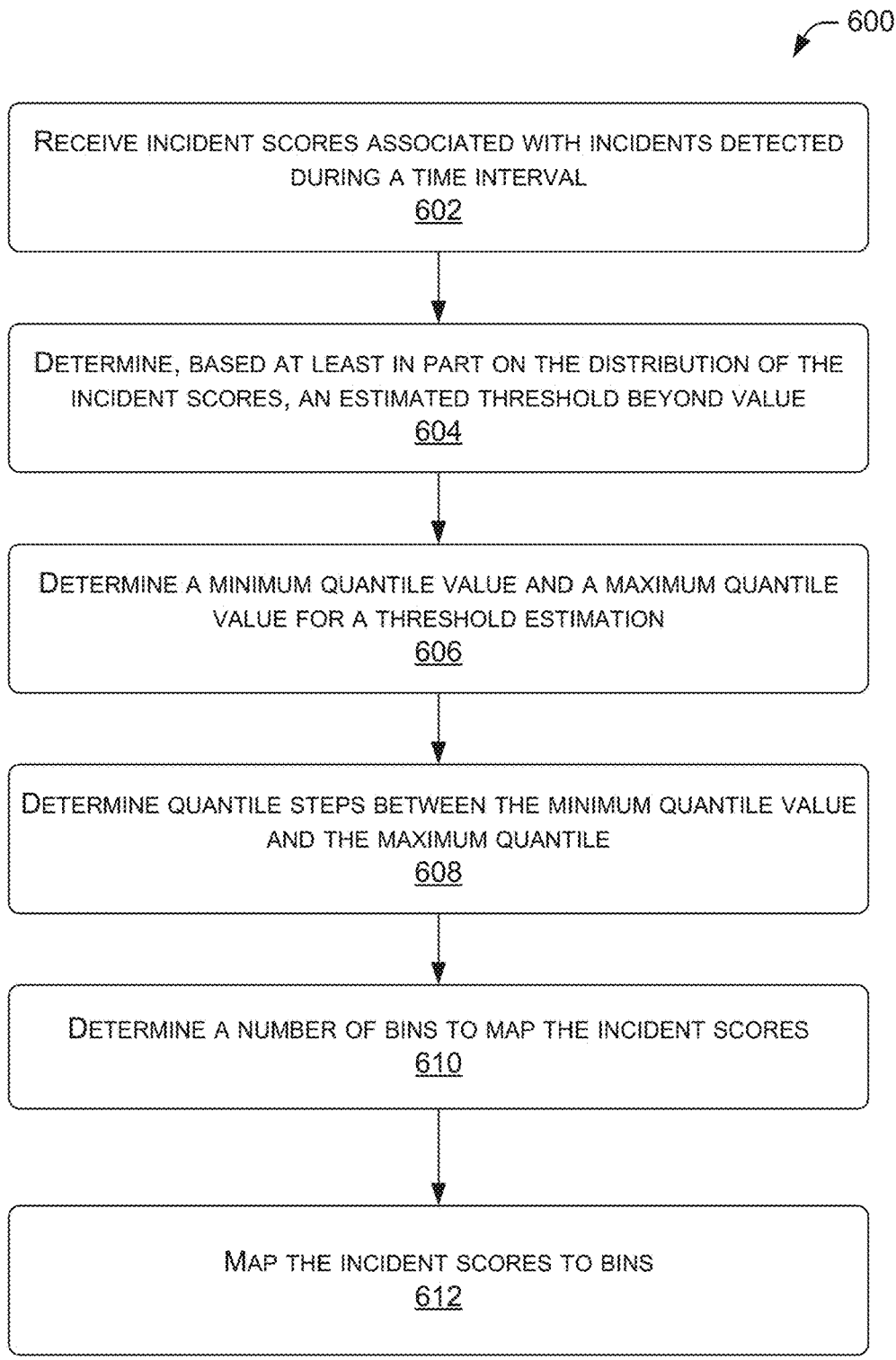
FIG. 6 illustrates an example process for mapping incident scores to a fixed range, as discussed herein.

FIG. 6 is a flowchart depicting an example process 600 for mapping incident scores to a fixed range, as discussed herein. Some or all of the process 600 may be performed by one or more components in FIGS. 1 and 2, as described herein. For example, some or all of process 600 may be performed by the computing device(s) 108, 200.

At operation 602, the process may include receiving incident scores associated with incidents detected during a time interval. For instance, the computing device 108 or the host device 102 may receive incident scores associated with incidents detected from the host device 102. The incidents may comprise data sensed by one or more sensors of the host device 102 during a time interval.

At operation 604, the process may include determining, based at least in part on the distribution of the incident scores, an estimated threshold beyond value. For instance, the computing device 108 or the host device 102 may employ a variety of techniques as described herein to analyze the incident scores. The computing device 108 or the host device 102 may determine a distribution of the incident scores. Estimating a threshold beyond which incident score values can be considered by testing the fit of an Extreme Value Theory (EVT) model against the data.

At operation 606, the process may include determining a minimum quantile value and a maximum quantile value for threshold estimation. In various examples, the computing device 108 or the host device 102 may determine a minimum quantile value and a maximum quantile value for threshold estimation. The minimum quantile value and the maximum quantile value may be determined by the computing device or the host device in a variety of ways as described herein and be used to determine which incidents may be presented to a customer to review in the user interface.

At operation 608, the process may include determining quantile steps between the minimum quantile value and the maximum quantile. For instance, the computing device 108 or the host device 102 may determine the quantile steps between the minimum quantile value and the maximum quantile for the threshold estimation.

At operation 610, the process may include determining the number of bins to map the incident scores. For instance, the computing device 108 or the host device 102 may determine the number of bins to map incident scores.

At operation 612, the process may include mapping the incident scores to bins. For instance, the computing device 108 or the host device 102 may map the incident scores to bins based on the value of the incident scores. In some examples, incidents with incident scores below the first quantile value are placed in the first bin. The incident score values greater than the last quantile threshold are placed in the last bin.

Figure 7:
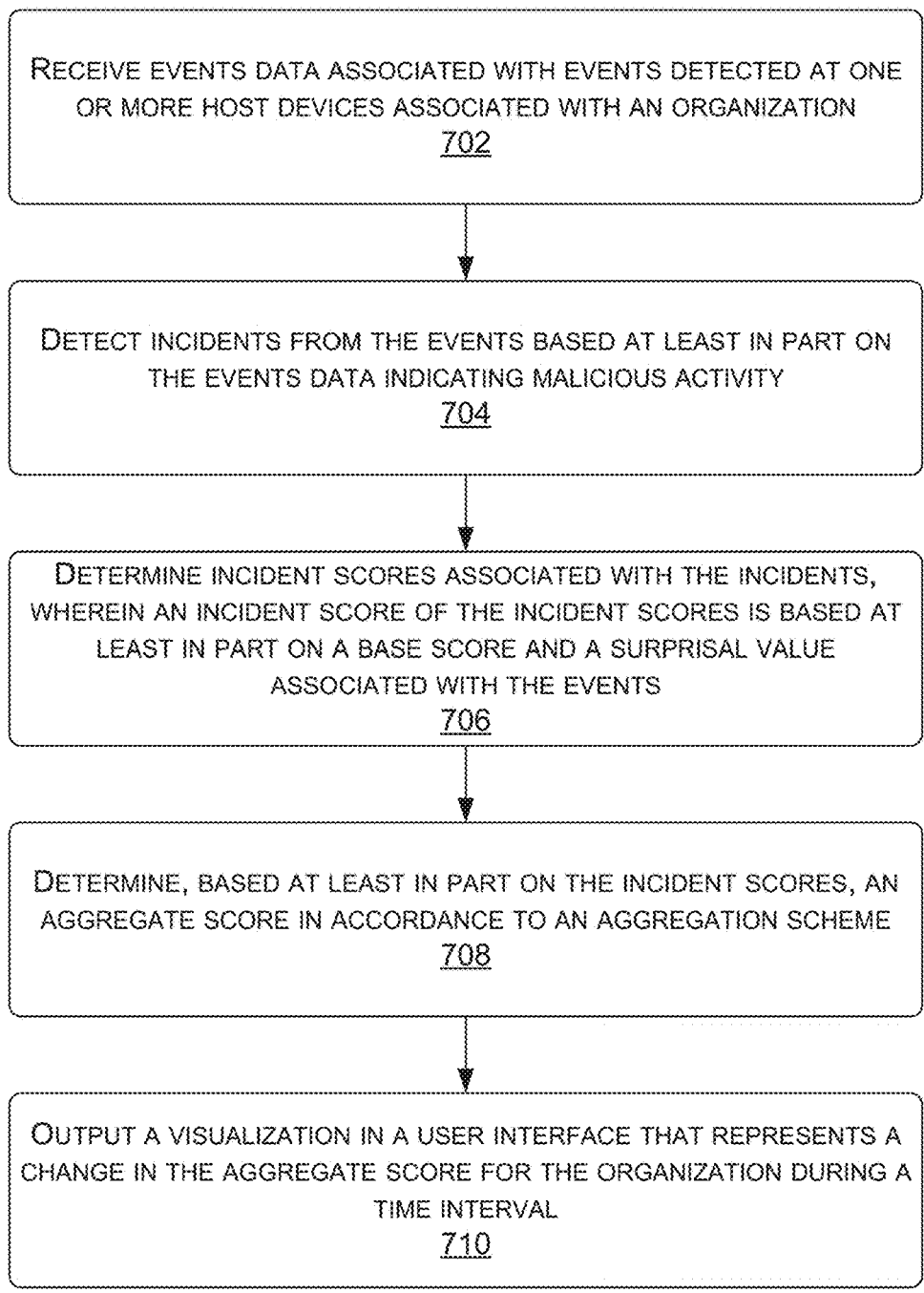
FIG. 7 illustrates an example process for determining an aggregate score based on incident scores using an aggregation scheme, as discussed herein.

FIG. 7 is a flowchart depicting an example process 700 for determining an aggregate score based on incident scores using an aggregation scheme, as discussed herein. Some or all of the process 700 may be performed by one or more components in FIGS. 1 and 2, as described herein. For example, some or all of process 700 may be performed by the computing device(s) 108, 200.

At operation 702, the process may include receiving events data associated with events detected at one or more host devices associated with an organization. For instance, the computing device 108 or the host device 102 may receive events data associated with events detected at one or more host devices associated with an organization. The event data may comprise process data or thread data sensed by one or more sensors of the one or more host devices.

At operation 704, the process may include detecting incidents from the events based at least in part on the events data indicating malicious activity. For instance, the computing device 108 or the host device 102 may employ a variety of techniques as described herein to process the event data to detect an incident associated with the event. The incident may be representative of malicious behavior associated with a process or a thread.

At operation 706, the process may include determining incident scores associated with the incidents, wherein an incident score of the incident scores is based at least in part on a base score and a surprisal value associated with the events. In various examples, the computing device 108 or the host device 102 may determine incident scores associated with the incidents. The incident score may be determined by the computing device or the host device in a variety of ways as described herein and be used to determine which incidents may be presented as one or more visualizations in the user interface.

At operation 708, the process may include determining, based at least in part on the incident scores, an aggregate score in accordance to an aggregation scheme. For instance, the computing device 108 or the host device 102 may determine an aggregate score in accordance to an aggregation scheme based at least in part on the incident scores.

At operation 710, the process may include outputting a visualization in a user interface that represents a change in the aggregate score for the organization during a time interval. For instance, the computing device 108 or the host device 102 may output the visualization (a graph, a map, an animation, or a combination thereof) based at least in part on a change in the aggregate score for the organization during a time interval.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform selected functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, the software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

Conclusion

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system for mapping incident scores to a fixed range, comprising:
   one or more processors; and
   computer-readable media storing first computer-executable instructions that, when executed by the one or more processors, cause the one or more processors to perform operations comprising:
   receiving events data associated with events detected at host devices;
   determining incidents from the events detected during a time interval;
   identifying patterns from the incidents based at least in part on the patterns meeting a predetermined criterion;
   determining pattern scores associated with surprisal values of the patterns, wherein the surprisal values are based at least in part on respective relative frequencies of the patterns;
   determining, based at least in part on the pattern scores, incident scores associated with the incidents;
   determining, based at least in part on a distribution of incident scores, an estimated threshold beyond value;
   determining, based at least in part on the estimated threshold beyond value, a minimum quantile value for a threshold estimation;
   determining, based at least in part on the estimated threshold beyond value, determining, based at least in part on the estimated threshold beyond value, a maximum quantile value for the threshold estimation;
   determining quantile steps between the minimum quantile value and the maximum quantile value for the threshold estimation;
   determining, based at least in part on the quantile steps, a number of bins to map the incident scores; and
   mapping the incident scores to bins.

2. The system of claim 1, the operations further comprising:
   determining an incident score is below a first quantile value; and
   mapping the incident score to a first bin.

3. The system of claim 1, the operations further comprising:
   determining an incident score is greater than a last quantile threshold; and
   mapping the incident score to a last bin.

4. The system of claim 1, the operations further comprising:
 determining an incident score is above a first quantile value;
 determining an incident associated with the incident score indicates malicious events; and
 determining to perform a remediation step based at least in part on the malicious events.

5. The system of claim 1, wherein:
 the incidents are determined based on a plurality of events detected at the host devices, and
 identifying the patterns includes identifying the patterns within the plurality of events.

6. The system of claim 5, the operations further comprising:
 receiving second incident scores associated with second incidents during a second time interval;
 determining at least one pattern change in the second incidents with respect to the incidents; and
 determining, based at least in part on the at least one pattern change, to recalculate the estimated threshold beyond value.

7. The system of claim 1, the operations further comprising:
 determining, based at least in part on averaging threshold beyond values over time, a second estimated threshold beyond value for a second time interval.

8. A method, comprising:
 receiving events data including incidents detected during a time interval at a plurality of host devices;
 identifying patterns from the incidents based at least in part on the patterns meeting a predetermined criterion;
 determining pattern scores associated with surprisal values of the patterns, wherein the surprisal values are based at least in part on respective relative frequencies of the patterns;
 determining, based at least in part on the pattern scores, incident scores associated with the incidents;
 determining, based at least in part on a distribution of the incident scores, an estimated threshold beyond;
 determining, based at least in part on the estimated threshold beyond, a minimum quantile value and a maximum quantile value for a threshold estimation;
 determining steps between the minimum quantile value and the maximum quantile value for the threshold estimation;
 determining, based at least in part on the steps, a number of bins to map the incident scores;
 determining a range of threshold scores for mapping the incident scores to bins; and
 mapping the incident scores to the bins.

9. The method of claim 8, wherein the minimum quantile value is determined based at least in part on a confidence value associated with the incident scores.

10. The method of claim 8, wherein the estimated threshold beyond is based at least in part on a generalized Pareto distribution.

11. The method of claim 8, further comprising:
 generating a notification based on mapping an incident score to a bin higher than a third bin.

12. The method of claim 8, further comprising:
 generating a user interface to present a visualization of mapping the incident scores to the bins.

13. The method of claim 8, wherein the estimated threshold beyond is based at least in part on a distribution of extreme values using the incident scores.

14. One or more non-transitory computer-readable media having computer executable instructions that, when executed, cause one or more processors to perform operations comprising:
 receiving events data including incidents detected at a time interval;
 identifying patterns from the incidents based at least in part on the patterns meeting a predetermined criterion;
 determining pattern scores associated with surprisal values of the patterns, wherein the surprisal values are based at least in part on respective relative frequencies of the patterns;
 determining, based at least in part on the pattern scores, incident scores associated with the incidents;
 determining, based at least in part on a distribution of the incident scores, a threshold beyond value;
 determining, based at least in part on the threshold beyond value, a minimum quantile value and a maximum quantile value for a threshold estimation;
 determining quantile steps between the minimum quantile value and the maximum quantile value;
 determining, based at least in part on the quantile steps, a number of bins to map the incident scores; and
 mapping the incident scores to bins.

15. The one or more non-transitory computer-readable media as recited in claim 14, wherein the operations further comprise:
 receiving input data including second incident scores; and
 determining output binned data based at least in part on mapping the second incident scores to the bins.

16. The one or more non-transitory computer-readable media as recited in claim 14, wherein the operations further comprise:
 mapping a set of incident scores associated with a client to the bins; and
 generating a notification for the client based at least in part on mapping the set of incident scores.

17. The one or more non-transitory computer-readable media as recited in claim 14, wherein the operations further comprise:
 determining to increase the minimum quantile value based at least in part on determining a number of incidents above a threshold are mapped to a bin higher than a first bin.

18. The one or more non-transitory computer-readable media as recited in claim 14, wherein the operations further comprise:
 determining to decrease the minimum quantile value based at least in part on determining a number of incidents below a threshold are mapped to a bin higher than a first bin.

19. The one or more non-transitory computer-readable media as recited in claim 14, wherein the operations further comprise:
 determining to recompute the threshold beyond value based at least in part on a change in the time interval.

* * * * *